Figure 1:
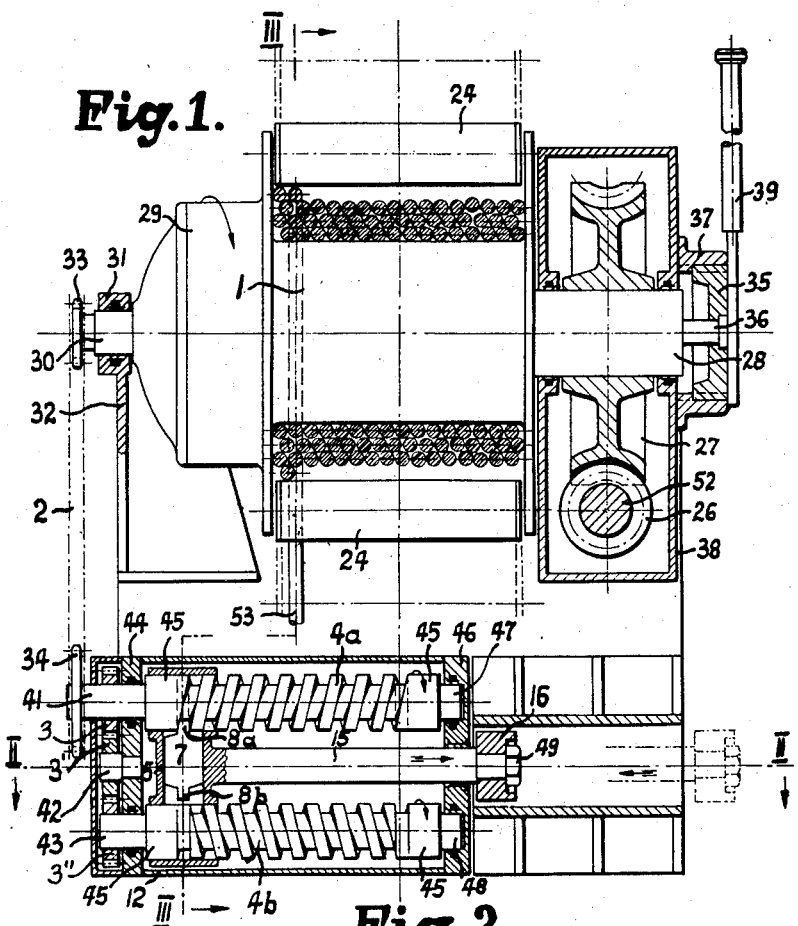

Aug. 7, 1956  F. SCHLANG ET AL  2,757,883
TRAVERSING GUIDE FOR A ROPE WINCH
Filed Nov. 6, 1953  2 Sheets-Sheet 1

Inventors
F. Schlang
W. Gumlich

Inventors
F. Schlang
W. Gumlich

United States Patent Office 2,757,883
Patented Aug. 7, 1956

2,757,883

TRAVERSING GUIDE FOR A ROPE WINCH

Franz Schlang and Willi Gumlich, Markt Oberdorf, Germany, assignors to the firm Schlang & Reichart, Markt Oberdorf, Allgau, Germany Application November 6, 1953, Serial No. 390,702

Claims priority, application Germany November 8, 1952

8 Claims. (Cl. 242—158)

This invention relates to certain improvements in or relating to rope winches and has special reference to the rope guiding devices therefor.

It is an object of the invention to provide a rope guiding device which is adapted for high loads and ensures a satisfactory winding up of the rope.

Another object of the invention is to provide a rope guiding device in which a positive connection is always existing between the drive and the rope guiding carriage.

A further object of the invention is to construct the rope guiding device in such a way that the rope may arrive from any desired direction in relation to the winding up direction or to the axis of the rope drum and that the rope is reliably prevented from slipping out of the rope guide pulley.

A still further object of the invention is to provide a device by which the formation of loops on the rope pulley in case of sudden slackening of the rope is prevented.

With these and further objects in view, the rope guiding device according to the present invention is characterized by a pair of spindles threaded in opposite or equal directions and being driven from the rope drum in the same or in opposite directions, respectively, the grooves of thread of the spindles at each end forming a cam-shaped run-out extending each in a plane perpendicularly to the axis of the spindle, a slide block guided on the two spindles, and a dog which is arranged in the slide block between the two spindles so as to be shiftable perpendicularly thereto, in such a way that either of the two tooth-shaped ends of the dog is adapted to engage alternately in the groove of either spindle thread, said dog being adapted to be disengaged from the respective spindle thread and engaged into the thread of the other spindle by said cam-shaped run-outs, while being held in its engaged position by a locking device during the reciprocating motion of the slide block between the end positions thereof.

According to a further feature of the invention the locking device preferably includes a bar with two circularly arched recesses and two grooves arranged in the dog and being alternately engaged with the locking bar. It is preferred to house the entire control device in a completely closed casing on whose outer side is mounted the guide for a carriage supporting the rope guiding pulley. The slide block may be coupled with the carriage through a connecting rod and a cross bar. The rope guiding pulley may be mounted on the carriage for rotation about 360° and a rope guide block may be mounted so as to be swingable about the axis of the rope guiding roller. According to a further feature of the invention a pair of rollers are mounted each in a pivoted lever on opposite sides of the rope drum and forced against the rope drum by spring action.

Other and further objects, features and advantages of the invention will be pointed out hereinafter and appear in the appended claims forming part of the application.

In the accompanying drawing a now preferred embodiment of the invention is shown by way of illustration and not by way of limitation.

Figure 2:
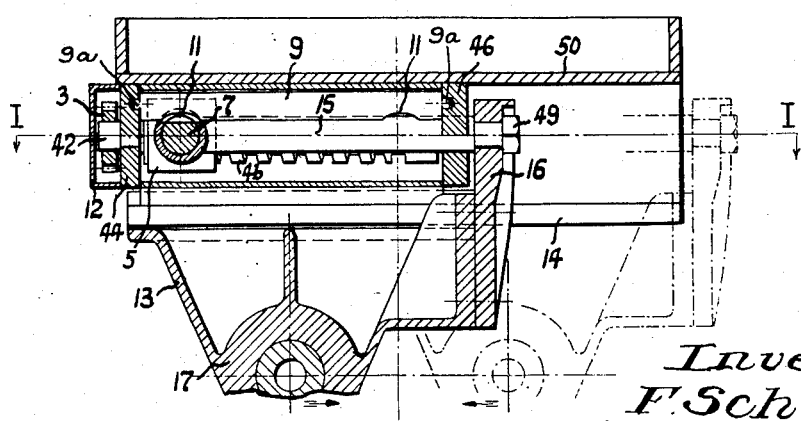
Figure 3:
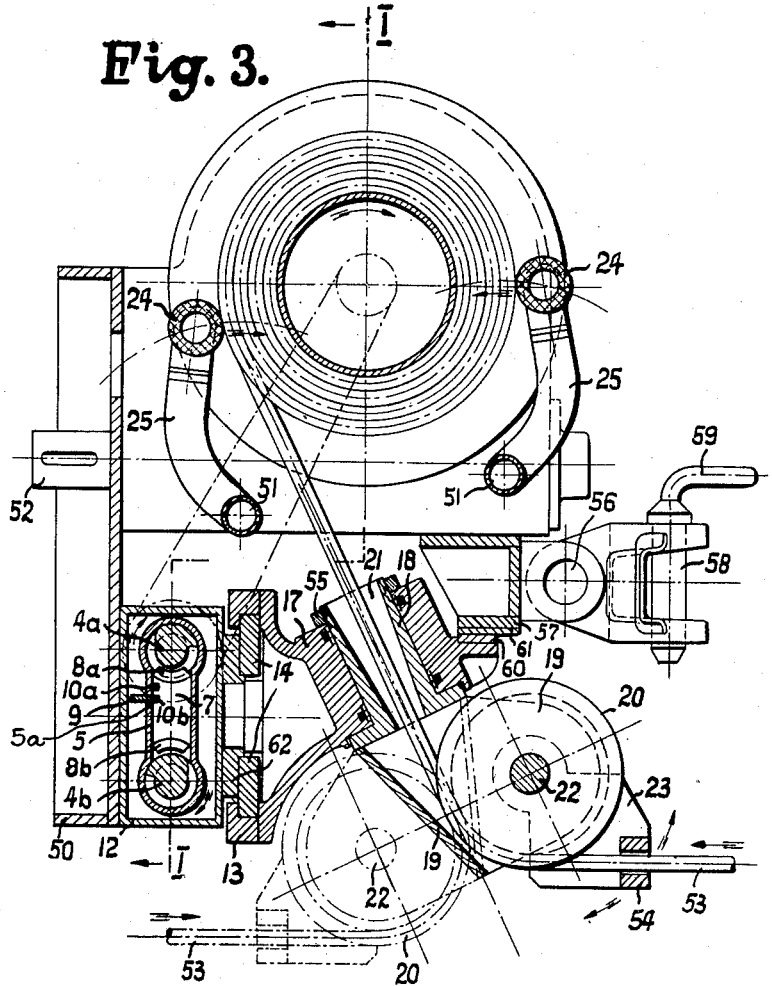
Figure 4:
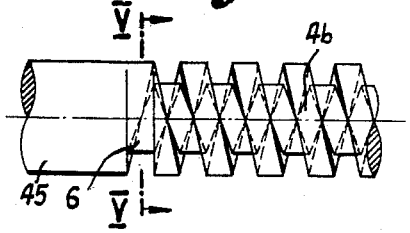
Figure 5:
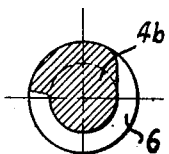

Fig. 1 is a longitudinal section through the rope guiding device on the line I—I of Fig. 2, Fig. 2 is a longitudinal section thereof on the line II—II of Fig. 1, Fig. 3 is a cross section thereof on the line III—III of Fig. 1, Fig. 4 is an end view of a threaded spindle with cam-shaped run-outs, on a larger scale, Fig. 5 is a section thereof, on the line V—V of Fig. 4.

Similar reference numerals denote similar parts in the different views.

Referring now to the drawings in greater detail it will be seen that the rope drum 1 is mounted for rotation on a shaft 28 which in turn is mounted for rotation in bearings of a gear casing 38 and driven by a worm wheel 27 meshing with a worm 26 on a shaft 52 which is driven from the motor (not shown). The connection between the shaft 28 and the drum 1 can be established by operation of a lever 39 which is fixedly connected to a threaded member 35 threadably engaging a female thread in a sleeve projecting from casing 38 and adapted to shift a control bar 36 in an axial direction for effecting the necessary shifting actions in the casing 29 housing the clutch and a reversing gear and/or brake, as the case may be. The left hand journal of the winch drum 1 is mounted for rotation in a bearing 31 of the frame 32 and bears at its extreme end a chain wheel 33 for transmission of driving power to the chain wheel 34 fixedly mounted on the shaft 41 of the square threaded spindle 4a. Through spur gears 3, 3', 3" mounted on shafts 41, 42, 43, respectively, the spare threaded spindle 4b is also driven, in the same direction as spindle 4a, from the rope drum 1. The spindles 4a and 4b are mounted for rotation in bearings provided in transverse walls 44 and 46 of the control casing 12, their right end journals being denoted 47 and 48. The slide block 5 formed with a pair of bores and thus having a cross section similar to that of a spectacle mount or frame is mounted to slide on the outer periphery of these two spindles 4a and 4b and on the cylindrical end positions 45 thereof, the bosses being connected by a hollow perpendicular section. One of the spindles 4a and 4b is provided with a right hand thread while the other one is provided with a left hand thread. The square-threaded grooves of these threaded spindles 4a and 4b at both ends merge with a cam-shaped run-out or end formation 6, each extending in a plane disposed vertically to the axis of the respective spindle, in such a way that in these end formations, the pitch quasi at first decreases to zero and then the depth of the groove also becomes zero. Arranged in the slide block 5 sliding on the two threaded spindles is a dog 7 which is slidable perpendicularly to the threaded spindles 4a and 4b and formed with tooth-shaped end formations 8a and 8b adapted to engage alternately in the grooves of the thread of the one or of the other threaded spindle 4a and 4b, respectively, so that the slide block 5 is moved accordingly in one or the other direction. The change-over from one direction of motion into the opposite one is effected by shifting the dog 7 in each of the two end positions of the slide block 5, whereby owing to the cam-shaped run-outs 6 of the grooves of the spindle thread each time one of the teeth 8a or 8b, respectively, is removed from one threaded spindle and the other tooth is engaged into the run-in groove of the other threaded spindle.

In order to prevent the dog from being forced out of the groove of the thread, there is provided a safety device. In the embodiment shown in the drawing the safety device consists of a locking bar 9 and two grooves 10a and 10b arranged in the dog 7. These two grooves correspond to the two engaging positions of the dog 7 and are alternately engaged with the locking bar 9 which is mounted in the end walls 44 and 46 by means of pin-shaped projections 9a and additionally supported by the walls of a slot 5a, Fig. 3, through which the bar 9 projects into the slide block 5. Provided on the points of the locking bar 9 corresponding to the two end positions of the carriage are sector-shaped recesses 11 corresponding to the cylindrical cross section of the dog 7 and permitting displacement of the dog at these points.

As the slide block 5 has reached one of its end positions, the transitional portion between the groove of the thread and the run-out groove 6 causes one of the teeth 8a or 8b of the dog 7 to be turned from its inclined position in relation to the axis of the spindle into a plane disposed vertically to the axis of the respective spindle 4a or 4b, whereby the cylindrically shaped dog 7 carries out a rotary motion about its own axis. Simultaneously the locking of the dog 7 is released by disengaging the locking bar 9 from the locking groove 10a. As the respective threaded spindle, for instance, 4b is further rotated, its tooth 8b is disengaged from the run-out groove of the threaded spindle 4b and simultaneously the other tooth 8a is engaged into the run-in groove of the threaded spindle 4a, as shown in Fig. 1, and on passage into the threaded groove it is also turned from the plane disposed vertically to the axis of the spindle into the inclined position corresponding to the pitch of the thread. By this angular displacement of the dog 7 the locking groove 10b is simultaneously engaged by the locking bar 9.

The entire mechanism for operating the carriage, i. e., the two threaded spindles 4a and 4b, the slide block 5 with the dog 7 and the locking device therefor are housed in a completely closed casing 12 which is filled with a lubricant. The carriage 13 carrying the rope guiding pulley 20 is slidably mounted on a separate carriage guide 14 which is advantageously arranged on the outside of this casing and mounted thereon by means of strips 62. A connecting rod 15 extending through the casing 12 of the control mechanism is connected to a cross bar 16 by means of a screw 49 which in turn is fixedly connected to the guide carriage 13, Fig. 2, so as to establish a rigid connection between the slide block 5 and the guide carriage 13 for the rope guide pulley. The rod 15 is fastened to, or formed integral with, the slide block 5 and guided through the wall of the casing 12 with a tight seal, e. g., by means of a suitable packing. Mounted on the guide carriage 13, in an eye 17 thereof, is a tubular pivot 18 which is formed integral with a bifurcated bearing bracket 19 in which guide pulley 20 is mounted for rotation in such a way that the side of the rope 53 running from the pulley 20 to the rope drum 1 passes centrally into the bore 21 of the pivot which is conically enlarged in an upward direction. Also mounted on the bearing pivot 22 of the guide pulley 20 for pivotal motion, is a guide block 23 having an eye 54 for guiding the rope 53 and preventing the same from slipping out of the guide pulley 20. The guide block 23 is able to adjust itself both radially in the direction of the rope and simultaneously to adjust the rope guide pulley 20 into the running direction of the rope. A pair of rollers 24 arranged on both sides of the rope drum 1 serve to press the cross wound superposed or banked up layers of the rope 53 onto the drum 1. These rollers 24 are mounted in levers 25 which are pivoted at 51 and pressed against the rope drum by action of springs (not shown).

As shown in Fig. 3, the winch is adapted to be mounted on the frame of a tractor or the like by means of a frame element 50 on which the frame element 32, the control casing 12 and the parts secured thereto are mounted. The journal 52 of the winch thus can be directly coupled to the power shaft of a tractor.

It will be seen from Fig. 3 that the eye 17 of the guiding carriage 13 is additionally slidably supported, by a plate 60, on a slide rail 61 mounted on a cross girder or bar 57 which simultaneously serves for attachment, by means of a joint pin 56, of a duplicate safety coupling 58, 59 for coupling a trailer or the like which normally would be coupled to the coupling of the tractor itself.

The pitch of the spindle thread normally amounts to about twice the thickness of the rope. Therefore, the speed of the spindle will be reduced, e. g. by a suitable ratio of the chain wheels 33 and 34, to one half of the speed of the rope drum. The shifting of the dog 7 from one of the spindles 4a or 4b to the other one, by action of the cam-shaped run-outs, requires only one half revolution of the control spindle. Hence, only one turn of the rope is wound up on the rope drum during the shifting operation. Then the contrary motion of the guiding carriage sets in immediately, so that the next turn of the rope is laid beside the last one.

Another advantage of the shifting of the guiding carriage according to the present invention consists in the fact that the positive drive is never interrupted but that the operative tooth of the dog 7 leaves the run-out groove of its spindle only when the engagement of the other tooth with the run-in groove of its spindle already has been established.

It should be noted that a modification of the winch as hereinbefore described and shown, with a pair of spindles rotating in opposite directions and being threaded in the same direction could also be used and on principle would be equivalent to the embodiment as shown.

While the invention has been described in detail with respect to a now preferred example and embodiment of the invention it will be understood by those skilled in the art after understanding the invention that various changes and modifications may be made without departing from the spirit and scope of the invention and it is intended, therefore, to cover all such changes and modifications in the appended claims.

We claim:

1. A rope guiding device for rope winches, comprising a rope guiding carriage, means for guiding the carriage on a linear path, a pair of spindles each formed with a helical groove in such a way that each groove at each end forms a cam-shaped run-out portion having the same width as the helical groove but no pitch, means for rotating the two spindles, a slide block guided on said spindles, a dog arranged in the slide block between the threaded spindles, so as to be shiftable at right angles to the spindles, said dog being formed with opposite tooth-shaped ends snugly fitting in the helical grooves, and being adapted to be alternately disengaged from the groove of either spindle, and to be engaged into the groove of the other spindle, in the two end positions of the slide block, by the cam-shaped run-outs of the threaded grooves, in such a way that the slide block even during the disengaging and re-engaging motions of the dog is continuously positively held in both axial directions, by said run-outs, for imparting a positive reciprocating movement to the slide block, means for positively locking the dog in position during the travel of the slide block between its end positions, said locking means including a stationary bar extending parallel to the spindles and adapted to be alternately engaged with either of two grooves in the dog corresponding to the two engaged positions of the dog with respect to the spindles, means for disengaging the bar from one of the grooves of the dog and positively re-engaging it in the other groove of the dog in the two end positions of the slide block, and means for operatively connecting the slide block with the rope guiding carriage.

2. A rope guiding device for rope winches, comprising a rope guiding carriage, means for guiding the carriage on a linear path, a pair of spindles each formed with a helical grove in such a way that each groove at each end forms a cam-shaped run-out portion having the same width as the helical groove but no pitch, means for rotating the two spindles, a slide block guided on said spindles, a dog arranged in the slide block between the threaded spindles, so as to be shiftable at right angles to the spindles, said dog being formed with opposite tooth-shaped ends snugly fitting in the helical groves, and being adapted to be alternately disengaged from the groove of either spindle, and to be engaged into the groove of the other spindle, in the two end positions of the slide block, by the cam-shaped run-outs of the threaded grooves, in such a way that the slide block even during the disengaging and re-engaging motions of the dog is continuously positively held in both axial directions, by said run-outs, for imparting a positive reciprocating movement to the slide block, means for positively locking the dog in position during the travel of the slide block between its end positions, said locking means including a stationary bar extending parallel to the spindles and adapted to be alternately engaged with either of two grooves in the dog corresponding to the two engaged positions of the dog with respect to the spindles, said bar projecting into the hollow interior of the slide block, through a guide slot provided therein, and formed at its opposite ends with two recesses in such a way that the respective groove of the dog when reaching either of the two recesses is not engaged by the bar, whereby the dog in the two end positions of the slide block can be disengaged from the groove in one of the spindles and re-engaged with the groove in the second spindle, and means for operatively connecting the slide block with the rope guiding carriage.

3. A rope guiding device for rope winches, comprising a rope guiding carriage, means for guiding the carriage on a linear path, a pair of spindles each formed with a helical groove in such a way that each groove at each end forms a cam-shaped run-out portion having the same width as the helical groove but no pitch, means for rotating the two spindles, a slide block guided on said spindles, a dog arranged in the slide block between the threaded spindles, so as to be rotatable and shiftable at right angles to the spindles, said dog being formed with opposite tooth-shaped ends snugly fitting in the helical grooves, and being adapted to be alternately disengaged from the groove of either spindle, and to be engaged into the groove of the other spindle, in the two end positions of the slide block, by the cam-shaped run-outs of the threaded grooves, in such a way that the slide block even during the disengaging and re-engaging motions of the dog is continuously positively held in both axial directions, by said run-outs, for imparting a positive reciprocating movement to the slide block, means for positively locking the dog in position during the travel of the slide block between its end positions, said locking means including a stationary bar extending parallel to the spindles and adapted to be alternately engaged with either of two grooves in the dog corresponding to the two engaged positions of the dog with respect to the spindles, means for disengaging the bar from one of the grooves of the dog and positively re-engaging it in the other groove of the dog in the two end positions of the slide block, and means for operatively connecting the slide block with the rope guiding carriage.

4. A rope guiding device for rope winches, comprising a rope guiding carriage, a rope guiding pulley rotatably supported on the carriage, a casing including a guide for the rope guiding carriage, and means in said casing for controlling said rope guiding carriage, said means comprising a pair of spindles each formed with a helical groove in such a way that each groove at each end forms a cam-shaped run-out portion having the same width as the helical groove but no pitch, means for rotating the two spindles, a slide block guided on said spindles, a dog arranged in the slide block between the threaded spindles, so as to be shiftable at right angles to the spindles, said dog being formed with opposite tooth-shaped ends snugly fitting in the helical grooves, and being adapted to be alternately disengaged from the groove of either spindle, and to be engaged into the groove of the other spindle, in the two end positions of the slide block, by the cam-shaped run-outs of the threaded grooves, in such a way that the slide block even during the disengaging and re-engaging motions of the dog is continuously positively held in both axial directions, by said run-outs, for imparting a positive reciprocating movement to the slide block, means for positively locking the dog in position during the travel of the slide block between its end positions, said locking means including a stationary bar extending parallel to the spindles and adapted to be alternately engaged with either of two grooves in the dog corresponding to the two engaged positions of the dog with respect to the spindles, means for disengaging the bar from one of the grooves of the dog and positively re-engaging it in the other groove of the dog in the two end positions of the slide block, and means for operatively connecting the slide block with the rope guiding carriage.

5. A rope guiding device for rope winches, comprising a rope guiding carriage, a rope guiding pulley rotatably supported on the carriage, a casing including a guide for the rope guiding carriage, and means in said casing for controlling said rope guiding carriage, said means comprising a pair of spindles each formed with a helical groove in such a way that each groove at each end forms a cam-shaped run-out portion having the same width as the helical groove but no pitch, means for rotating the two spindles, a slide block guided on said spindles, a dog arranged in the slide block between the threaded spindles, so as to be shiftable a right angles to the spindles, said dog being formed with opposite tooth-shaped ends snugly fitting in the helical grooves, and being adapted to be alternately disengaged from the groove of either spindle, and to be engaged into the groove of the other spindle, in the two end positions of the slide block, by the cam-shaped run-outs of the threaded grooves, in such a way that the slide block even during the disengaging and re-engaging motions of the dog is continuously positively held in both axial directions, by said run-outs, for imparting a positive reciprocating movement to the slide block, means for positively locking the dog in position during the travel of the slide block between its end positions, said locking means including a stationary bar extending parallel to the spindles and adapted to be alternately engaged with either of two grooves in the dog corresponding to the two engaged positions of the dog with respect to the spindles, means for disengaging the bar from one of the grooves of the dog and positively re-engaging it in the other groove of the dog in the two end positions of the slide block, and means for operatively connecting the slide block with the rope guiding carriage.

6. A rope guiding device for rope winches, comprising a rope guiding carriage, a rope guiding pulley, a bearing member for the pulley, a hollow pivot by which said bearing member is swivel-mounted on the rope guiding carriage like a caster for rotation through 360°, said hollow pivot forming a passage for the rope, a casing including a guide for the rope guiding carriage, and means in said casing for controlling said rope guiding carriage, said means comprising a pair of spindles each formed with a helical groove in such a way that each groove at each end forms a cam-shaped run-out portion having the same width as the helical groove but no pitch, means for rotating the two spindles, a slide block guided on said spindles, a dog arranged in the slide block between the threaded spindles, so as to be shiftable at right angles to the spindles, said dog being formed with opposite tooth-shaped ends snugly fitting in the helical grooves, and being adapted to be alternately disengaged from the groove of either spindle, and to be engaged into the groove of the other spindle, in the two end positions of the slide block, by the cam-shaped run-outs of the threaded grooves, in such a way that the slide block even during the disengaging and re-engaging motions of the dog is continuously positively held in both axial directions, by said run-outs, for imparting a positive reciprocating movement to the slide block, means for positively locking the dog in position during the travel of the slide block between its end positions, said locking means including a stationary bar extending parallel to the spindles and adapted to be alternately engaged with either of two grooves in the dog corresponding to the two engaged positions of the dog with respect to the spindles, means for disengaging the bar from one of the grooves of the dog and positively re-engaging it in the other groove of the dog in the two end positions of the slide block, and means for operatively connecting the slide block with the rope guiding carriage.

7. A rope guiding device for rope winches, comprising a rope guiding carriage, a rope guiding pulley, a bearing member for the pulley, a hollow pivot by which said bearing member is swivel-mounted on the rope guiding carriage like a caster for rotation through 360°, said hollow pivot forming a passage for the rope, a rope guide block mounted to swing about the axis of rotation of the rope guiding pulley, a casing including a guide for the rope guiding carriage, and means in said casing for controlling said rope guiding carriage, said means comprising a pair of spindles each formed with a helical groove in such a way that each groove at each end forms a cam-shaped run-out portion having the same width as the helical groove but no pitch, means for rotating the two spindles, a slide block guided on said spindles, a dog arranged in the slide block between the threaded spindles, so as to be shiftable at right angles to the spindles, said dog being formed with opposite tooth-shaped ends snugly fitting in the helical grooves, and being adapted to be alternately disengaged from the groove of either spindle, and to be engaged into the groove of the other spindle, in the two end positions of the slide block, by the cam-shaped run-outs of the threaded grooves, in such a way that the slide block even during the disengaging and re-engaging motions of the dog is continuously positively held in both axial directions, by said run-outs, for imparting a positive reciprocating movement to the slide block, means for positively locking the dog in position during the travel of the slide block between its end positions, said locking means including a stationary bar extending parallel to the spindles and adapted to be alternately engaged with either of two grooves in the dog corresponding to the two engaged positions of the dog with respect to the spindles, means for disengaging the bar from one of the grooves of the dog and positively re-engaging it in the other groove of the dog in the two end positions of the slide block, and means for operatively connecting the slide block with the rope guiding carriage.

8. A rope guiding device for rope winches, comprising a rope guiding carriage, means for guiding the carriage on a linear path, a pair of spindles each formed with a helical groove in such a way that each groove at each end forms a cam-shaped run-out portion having the same width as the helical groove but no pitch, means for rotating the two spindles, a slide block guided on said spindles, a dog arranged in the slide block between the threaded spindles, so as to be shiftable at right angles to the spindles, said dog being formed with opposite tooth-shaped ends snugly fitting in the helical grooves, and being adapted to be alternately disengaged from the groove of either spindle, and to be engaged into the groove of the other spindle, in the two end positions of the slide block, by the cam-shaped run-outs of the threaded grooves, in such a way that the slide block even during the disengaging and re-engaging motions of the dog is continuously positively held in both axial directions, by said run-outs, for imparting a positive reciprocating movement to the slide block, means for positively locking the dog in position during the travel of the slide block between its end positions, said locking means including a stationary bar extending parallel to the spindles and adapted to be alternately engaged with either of two grooves in the dog corresponding to the two engaged positions of the dog with respect to the spindles, means for disengaging the bar from one of the grooves of the dog and positively re-engaging it in the other groove of the dog in the two end positions of the slide block, and means for operatively connecting the slide block with the rope guiding carriage, the pitch of the spindle groove helix being about twice the thickness of the rope to be wound up and the speed of the spindles being reduced in said ratio in relation to the speed of the winch while the run-outs are shaped so as to effect the dog-shifting within one half revolution of the spindle.

References Cited in the file of this patent

UNITED STATES PATENTS

| | | |
|---|---|---|
| 2,421,269 | Joyce | May 27, 1947 |
| 2,437,725 | Conner | Mar. 16, 1948 |